US00RE36555E

United States Patent [19]

Tentler

[11] E Patent Number: Re. 36,555

[45] Reissued Date of Patent: Feb. 8, 2000

[54] CUSHIONED NOCK

[75] Inventor: Lynn A. Tentler, Fond du Lac, Wis.

[73] Assignee: Tru-Fire Corporation, North Fond du Lac, Wis.

[21] Appl. No.: 08/595,726

[22] Filed: Feb. 1, 1996

Related U.S. Patent Documents

Reissue of:

[64] Patent No.: 5,016,603
Issued: May 21, 1991
Appl. No.: 07/364,207
Filed: Jun. 8, 1989

U.S. Applications:

[63] Continuation of application No. 08/202,864, Feb. 25, 1994, abandoned, which is a continuation of application No. 07/838,471, Feb. 19, 1992, abandoned, which is a continuation-in-part of application No. 07/139,903, Dec. 31, 1987, abandoned, which is a continuation-in-part of application No. 07/040,308, Apr. 20, 1987, abandoned.

[51] Int. Cl.[7] ..... F41B 5/14

[52] U.S. Cl. ..... 124/91; 124/23.1

[58] Field of Search ..... 124/91, 90, 23.1, 124/35.2; 403/221, 222, 225, 372, 228; 224/114.5; 16/108

[56] References Cited

U.S. PATENT DOCUMENTS

| | | | |
|---|---|---|---|
| 1,631,719 | 6/1927 | Chandler | 16/108 X |
| 2,565,605 | 8/1951 | Grayson | 124/114.5 |
| 2,777,437 | 1/1957 | Allen | 124/91 |
| 3,010,447 | 11/1961 | Roemer | 124/91 |
| 3,340,862 | 9/1967 | Saunders | 124/91 |
| 3,375,815 | 4/1968 | Novak | 124/91 X |
| 3,507,525 | 4/1970 | Sable | 403/372 |
| 3,703,771 | 11/1972 | Saunders | 124/91 X |
| 3,937,205 | 2/1976 | Saunders | 124/91 |
| 4,086,904 | 5/1978 | Suski et al. | 124/90 |

FOREIGN PATENT DOCUMENTS

| | | | |
|---|---|---|---|
| 882838 | 11/1961 | United Kingdom | 16/108 |

*Primary Examiner*—Harry C. Kim
*Attorney, Agent, or Firm*—Robert C. Curfiss; Mark A. Tidwell

[57] ABSTRACT

A cushioned nock is mounted on a bow string to be between the arrow and a bow string release device. The cushioned nock comprises a[n elastomeric] *compressible* cylinder having an axial hole to receive the bow string. The cylinder is slit to permit the cylinder to be spread open for mounting on the string. A split ring fits in an external groove on the cylinder and is squeezed to clamp the cylinder on the string. The cylinder has a flange at each end to prevent damage to the arrow or the release. A similar cushioned nock or a conventional plastic lined, clamp type nock is mounted on the string above the arrow to fix the nocking point on the string. It is preferred to use a cushioned nock on each side of the nocking point (the point engaged by the arrow nock). Another cushioned nock can be mounted below the release device to allow mounting the device on the string pending use.

12 Claims, 2 Drawing Sheets

CUSHIONED NOCK

Matter enclosed in heavy brackets [ ] appears in the original patent but forms no part of this reissue specification; matter printed in italics indicates the additions made by reissue.

[This is a continuation-in-part of my Application Ser. No. 139,903 filed Dec. 31, 1987, now abandoned, which was a continuation in part of my application Ser. No. 040,308, filed Apr. 20, 1987, now abandoned.] *This is a continuation of application Ser. No. 08/202,864, filed Feb. 25, 1994, now abandoned, which is a continuation of Ser. No. 07/838,471, filed Feb. 19, 1992, now abandoned, which is a Reissue application of U.S. Pat. No. 5,016,603, issued May 21, 1991, Ser. No. 07/364,207, filed Jun. 8, 1989, which is a continuation-in-part of Ser. No. 07/139,903, filed Dec. 31, 1987, now abandoned, which is a continuation-in-part of Ser. No. 07/040,308, filed Apr. 20, 1987, now abandoned.*

BACKGROUND OF THE INVENTION

The notched tip (called the "arrow nock") of an arrow engages the bow string at the "nocking point". A "string nock" is generally mounted on the string above the arrow nock to locate the nocking point. There are various string nocks in use today.

A single nock serves well if the bow is being drawn with the fingers. But if a bow string release device is used, the geometry of the bow string at full draw relative to the release and arrow puts a substantial force on the release pushing the release against the arrow. The result is that the arrow will fall off the string under either of two conditions: (1) The hunter draws back when he sights an animal and then finds he can't take the shot, becomes tired and lets the bow return to the undrawn position . . . the arrow will almost certainly fall off . . . (2) The archer draws the bow to full draw and, while aiming, lets the arrow creep forward slightly, as most archers do, and just prior to releasing the arrow, he pulls back to full draw again; at this time the arrow will drop off most of the time.

If a clamp-on type of nock is used below the arrow to keep the release away from the arrow, the bow can be drawn without the arrow falling off. But, the metallic, clamp-on nock tends to "chew up" the release and a groove will be worn in the top of the barrel (if the release barrel is made of soft metal or plastic). This will allow the release to slide over the nock, creating unwanted pressure on the arrow nock and which leads to arrow torque and poor arrow flight. If that does not occur, the constant pressure on the string nock from the release will cause the string nock to loosen and slide up to the arrow nock, creating the aforementioned problems. Many times this will cause the string serving to be severed and unraveled. The arrow nock can also be gouged by the string nock.

SUMMARY OF THE INVENTION

The principal object of this invention is to provide an improved cushioned string nock which minimizes damage to the arrow nock while improving flight of the arrow.

The present invention is directed to protecting the bow string release device from damage by the nock positioned under the arrow and also to protect the bow string serving and the arrow nock. When a cushioned nock is used on each side of the nocking point the arrow nock is well protected against gouging and the like. Furthermore, poor arrow flight caused by a wedging or pinching effect is eliminated and accuracy of arrow flight is enhanced.

The cushioned nock must be resilient enough so it can be squeezed into tight clamping engagement with the bow string without damaging it. It will not separate servings on the string. It conforms to the string and still may be moved along the string to adjust its position by loosening the clamp ring, moving the nock and reclamping the ring.

The present nock is cushioned to guard against damage to the arrow or to the release or to the arrow nock. It also eliminates wedging or pinching which cause poor arrow flight. Should the cushioned nock slip it will only affect the wedging problem but the severity of the problem will be greatly reduced due to the cushioned nock design.

The present nock does, however, exert force on the arrow nock. When a cushioned nock is used on each side of the arrow nock each nock exerts a rearward force on the arrow nock and this force continues even though the archer may be easing off a bit. Thus, the nocks hold the arrow nock on the bow string rather than falling off as typical in the art. The arrow nock is not damaged by this elastomeric material.

Use of the cushioned nocks keeps the index finger separated from the adjacent finger, thus preventing the fingers from pinching the arrow nock and impairing arrow flight.

Another object of the present invention is to provide a cushioned nock which can be positioned below the release to prevent the release from sliding along the bow string.

Still another object is to provide a nock which can be loosened or removed from the bow string, thus permitting easy replacement or adjustment. If the nock is moved without loosening the servings will separate and that damages the bow string.

DETAILED DESCRIPTION OF THE DRAWINGS

As used herein, the term "elastomeric material" means a material having the ability to be stretched at least twice its original length and to retract very rapidly to approximately its original length when released. Put another way, the term means a material which can be stretched substantially (short of tearing the material) and to return rapidly to approximately its original length. It does not mean harder, less elastic materials, such as nylon or similar thermoplastic or thermosetting materials, which can cause damage to an arrow and are not resilient enough to grip the bow string and, therefore, tend to slide or move on the string.

Figure 4:
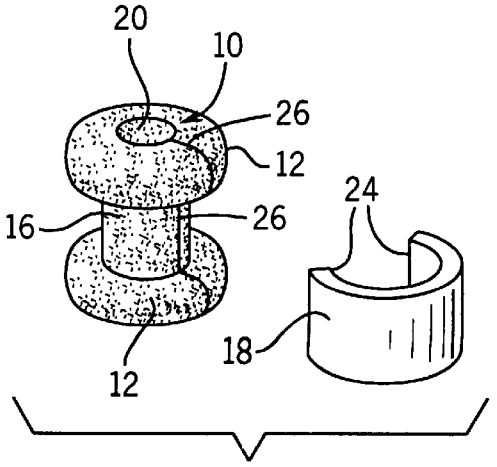
FIG. 4 is an enlarged detailed perspective view of the present cushioned nock.

A string nock according to this invention comprises a *compressible or* rubber (elastomeric) cylinder 10 having a flange 12 at each end of the cylinder. Each flange is relatively thick (in the axial direction) and has a radiused edge 14. The flanges are spaced far enough apart to form a groove 16 receiving a C-shaped metal clamp or retaining ring 18. The cylinder has an axial hole 20 to receive a bow string 22. The ring is open, as shown in FIG. 4, when received by the purchaser but is closed enough to remain in the groove 16. A special tool may be used to squeeze the ring. The open ends 24 of the retainer 18 are aligned with the slit 26 in the cylinder to allow the cylinder to be opened far enough to receive a bow string 22. When the cylinder is closed on the bow string, the retainer can be rotated to position the ends 24 opposite or away from the slit 26. Then a tool is used to squeeze the retainer closed and clamp the nock on the string. The retainer can be opened easily to move the nock or to remove a worn nock.

The nock is mounted without requiring removal of the bow string from the bow. This means the "weight" of the bow is not altered in the process. This is important since the bow need not be re-calibrated by reason of mounting the nock.

Figure 1:
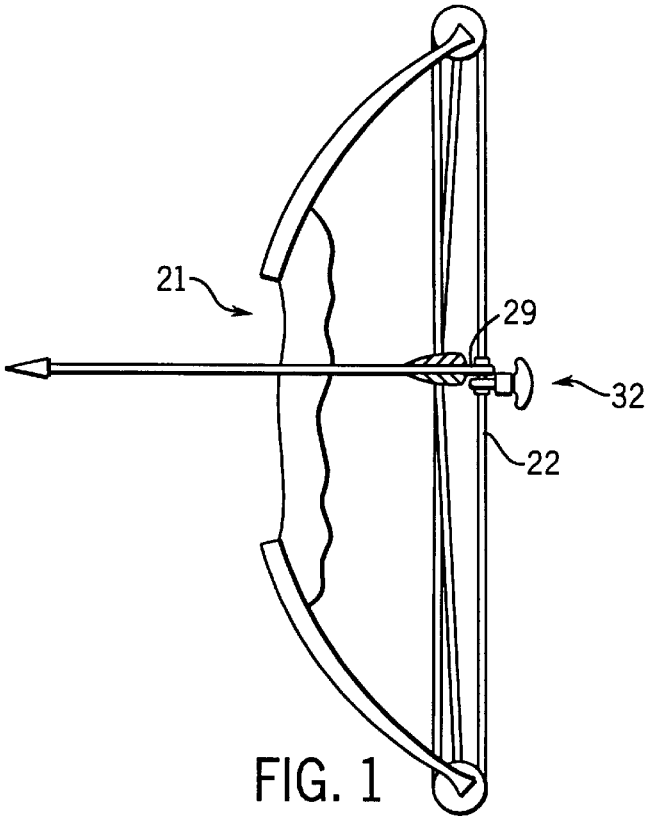
FIG. 1 is a side elevation showing an arrow on a compound bow with a release device in place.
Figure 2:
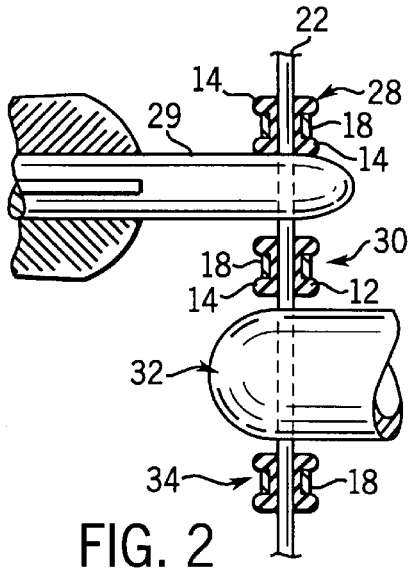
FIG. 2 is an enlarged fragmentary view of parts of an arrow, release and string along with the preferred arrangement of nocks mounted on the string.
Figure 3:
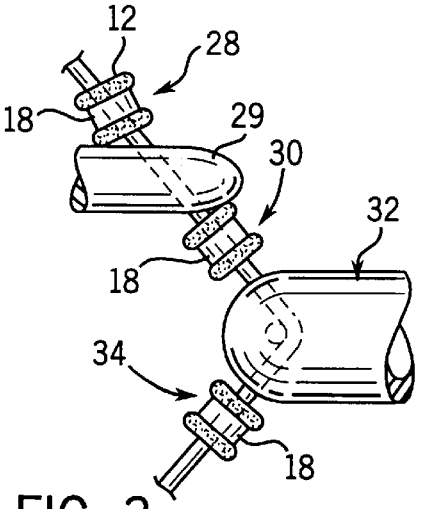
FIG 3 shows the relationship of the parts shown in FIG. 2 at full draw.

When shooting with a release, there should be a minimum of one string nock 30 which will serve to keep the release and arrow separated. Additionally and preferably, there should be a cushioned string nock 28 above the arrow. The cushioned nock 30 positioned below the arrow prevents the release from engaging the arrow as the bow is drawn. Both nock 28 and nock 30 engage the arrow nock 29 at full draw and the cushioned flanges are compressed as shown in FIG. 3. The geometry is such that a force urging the arrow against the string is developed between each nock and the string. These forces continue to act if the string is let off a bit. Thus the arrow is held against the string rather than falling off as typical of the prior art.

I find that use of cushioned nocks 28 and 30 on either side of the arrow nock definitely enhances arrow flight and there is no damage to the nock. Finger shooters (persons who draw the arrow using fingers, not a release) find the nocks keep their fingers off the arrow which is desirable.

A release 32 can be of any desired type and is positioned below the cushioned nock 30. The release will tend to slide along the bow string so a third cushioned nock 34 is mounted below the release position to keep the release at the desired location. The cushioned nock 34 below the release will not damage the release.

Figure 5:
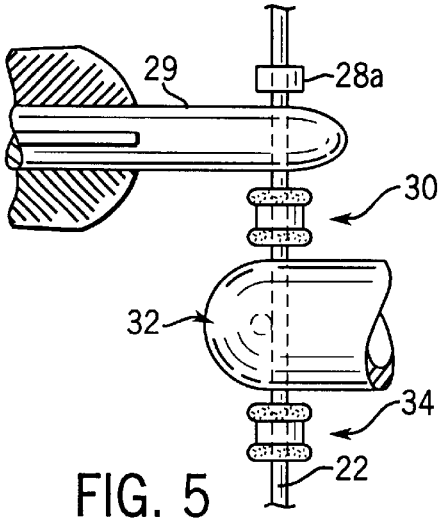
FIG. 5 is similar to FIG. 2 but shows a clamp-on string nock 28 instead of a cushioned nock.

It will be understood that when properly used, the combination of a standard nock 28A above the arrow (FIG. 5) prevents the nocking point on the string from shifting upwardly. This is satisfactory but may damage the arrow nock 29 slightly and degrade the arrow flight. The plastic lined metal nock 28A firmly clamped on the string above the arrow keeps the nock point uniform.

The cushioned nocks 28 and 30 on either side of the arrow nock should be mounted so as to allow a little space between the arrow and each of the nocks. If not enough space is provided it will be obvious that when the bow is drawn forces will be placed against the cushioned nocks which could possibly cause them to slide. Any additional forces not taken up by sliding of nocks 28 and 30 will be applied against cushioned nock 34.

Cushioned nock 34 below the release 32 is an optional feature. That nock is used when it is desired to mount the release on the string and leave it there pending the occasion to use the release, i.e., when game is sighted. But if this type of shooting is not contemplated then nock 34 would be unnecessary.

The rounded edge 14 on each cushioned nock flange 12, permits the nock to compress to accommodate various angles between the arrow and the flange.

Since the retaining ring 18 is not as thick as the depth of the groove 16, the ring is kept out of contact with the arrow under all operating conditions and insures against damaging the tip of the arrow or damaging the bow string release device.

Figure 6:
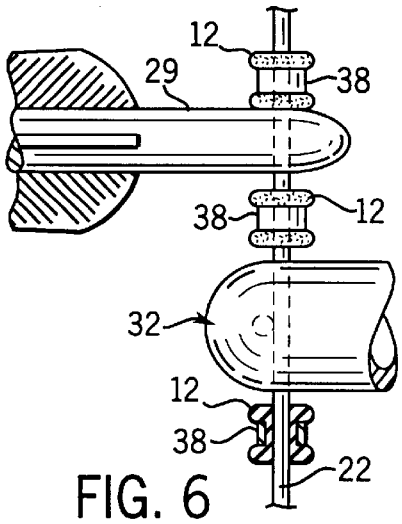
FIG. 6 is a view quite similar to FIG. 2 but shows cushioned nocks incorporating different clamp ring.
Figure 7:
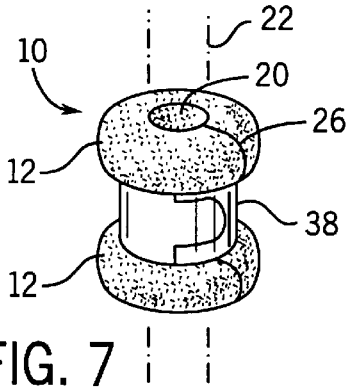
FIG. 7 is an enlarged perspective view of a nock with different clamp ring.

In FIG. 6, each cushioned nock is provided with a clamp ring 38 which, as may be seen in FIGS. 6 and 7, is provided with a tongue and groove arrangement on the confronting "ends" 40 of the ring. Thus, one end 40 has the projecting tongue 42 to be received in the groove 44 in the other end of the ring. This prevents the ring getting distorted during closure since the tongue and groove retain alignment. The cushioned cylinder 10 is provided with the radial split 26 as in the first embodiment.

Figure 8:
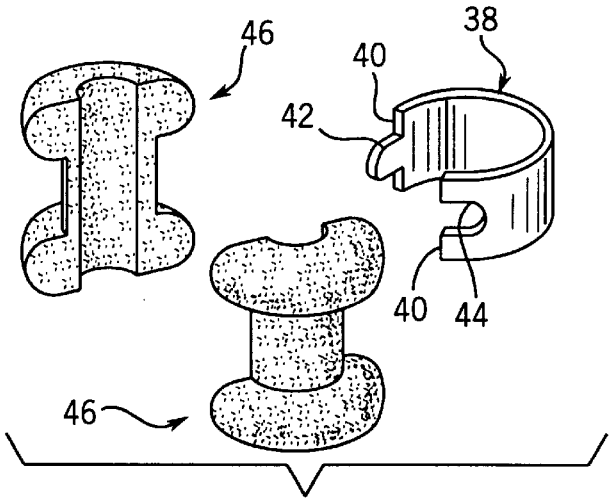
FIG. 8 is an enlarged, exploded perspective view showing a split construction for the cushioned portion of the nock while utilizing the duck tail type clamp ring shown in FIGS. 6 and 7.

In FIG. 8 the cushioned cylinder is fabricated of two semi-cylinders 46, 46 which facilitates mounting the cylinder on the string. Of course, the semi-cylinders 46 must be held together by the user finger until the clamp ring 38 is closed.

Figure 9:
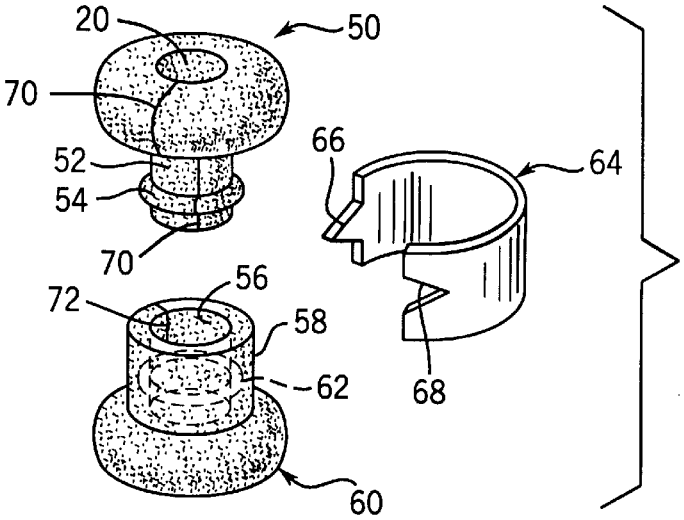
FIG. 9 is an enlarged exploded perspective view similar to FIG. 8 but having still another cushioned member.

FIG. 9 shows an arrangement avoiding any slit or mating face going from the interior bore 20 of the assembled cylinder to the outside of the cylinder. Thus, the upper half 50 of the composit cylinder here has a depending plug portion or hub 52 having a shoulder 54 molded thereon. The hub is designed to be received in the bore 56 of the hub 58 projecting upwardly from the bottom half 60 of the cylinder. The rib or shoulder 54 on plug 52 is received in a groove 62 inside hub 58. The upper and lower halves of the cylinder are split at 70, 72 respectively but, when assembling the parts, the splits are deliberately misaligned so there is no split running directly from the inside to the outside in the region of the clamping ring 64. It is true that each shoulder will have a split running from the inside to the outside, but that is of minor consideration. This composite cushioned nock is designed to avoid having the string working into a slit and cutting against the clamp ring 64. The clamp ring 64 in FIG. 9 has a different tongue and groove arrangement in that this is a V-shaped tongue 66 received in a cooperating V-shaped groove 68.

The elastomeric material used by me has a durometer of about 80 on the A Shore scale. I have used durometer of 70–90. Other durometers may be useable but, at present, the indicated durometer is preferred.

I claim:

1. A cushioned nock for use with an archer bow including a bow string, said nock mounted on said string to locate an arrow at a nocking point below said string nock with said cushioned nock comprising:

a[n elastomeric] *cylinder* cushioned *with a compressible material, said compressible material of the type adapted for absorbing a compressive force and returning to an initial state, said* cylinder having an axial hole therethrough and a slit extending from said hole to the outside of the cylinder enabling the cylinder to be opened at the slit to place the cylinder on said bow string, a cushioned flange at each end of said cylinder forming a groove around said cylinder between said flanges, and a generally C-shaped retainer releasingly disposed in said groove with the ends of the retainer spaced far enough for a bow string to pass therebetween and for said cylinder to be opened far enough to receive a bow string, said retainer being squeezed closed on said [elastomeric] *compressible* cushioned cylinder releasably securing the cylinder on the bow string and being able to be opened for adjustment or removal.

2. In an archery bow including a bow string, a first cushioned nock mounted on said string to locate an arrow at a nocking point below said cushioned nock, a second cushioned nock mounted on said string below said nocking point far enough to receive the end of an arrow between the first and second cushioned nocks, at least one of said nocks comprising:

a[n elastomeric] *cylinder* cushioned *with a compressible material, said compressible material of the type adapted for absorbing a compressive force and returning to an initial state, said* cylinder having an axial hole therethrough and a slit extending from said hole to the outside of the cylinder enabling the cylinder to be opened at the slit to place the cylinder on said bow string, a cushioned flange at each end of said cylinder forming a groove around said cylinder between said flanges, and a generally C-shaped retainer releasingly disposed in said groove with the ends of the retainer spaced far enough for said bow string to pass therebetween and for said cylinder to be opened far enough to receive said bow string, said retainer being squeezed closed on said [elastomeric] *compressible* cushioned cylinder releasably securing the cylinder on said bow string and being able to be opened for adjustment or removal.

3. In the archery bow defined in claim 2, a third cushioned nock mounted on said string far enough below said second cushioned nock to permit mounting on said string a release device between said second and said third cushioned nocks.

4. In an archery bow including a bow string, a clamp-on string nock fixed on said string to locate an arrow at a nocking point below said string nock, and a first cushioned nock mounted on said string below said nocking point far enough to receive the end of an arrow between said clamp-on nock and said cushioned nock, and said cushioned nock comprising:

a[n elastomeric] *cylinder* cushioned *with a compressible material, said compressible material of the type adapted for absorbing a compressible force and returning to an initial state, said* cylinder having an axial hole therethrough and a slit extending from said hole to the outside of the cylinder enabling the cylinder to be opened at the slit to place the cylinder on said bow string, a cushioned flange at each end of said cylinder forming a groove around said cylinder between said flanges, and a generally C-shaped retainer releasingly disposed in said groove with the ends of the retainer spaced far enough for a bow string to pass therebetween and for said cylinder to be opened far enough to receive said bow string, said retainer being squeezed closed on said [elastomeric] *compressible* cushioned cylinder releasably securing the cylinder on said bow string and being able to be opened for adjustment or removal.

5. In the archery bow defined in claim 4, a second cushioned nock mounted on said string far enough below said cushioned nock to permit mounting on said string a release device between the cushioned nocks.

6. A cushioned nock for use with an archery bow including a bow string, said nock mounted on said string to locate an arrow at a nocking point below said string nock with said cushioned nock comprising:

a[n elastomeric] *compressible* cushioned cylinder having an axial hole therethrough and a slit extending from said hole to the outside of the cylinder enabling the cylinder to be opened at the slit to place the cylinder on said bow string, a flange at each end of said cylinder forming a groove around said cylinder between said flanges, and a clamp ring in said groove, said ring being squeezed closed on said [elastomeric] *compressible* cylinder releasably securing the cylinder on said bow string and capable of being opened to adjust the cylinder on said string or to remove the cylinder.

7. In an archery bow including a bow string, a first cushioned nock mounted on said string to locate an arrow at a nocking point below said cushioned nock, a second cushioned nock mounted on said string below said nocking point far enough to receive the end of an arrow between the first and second cushioned nocks, at least one of said nocks comprising:

a[n elastomeric] *compressible* cushioned cylinder having an axial hole therethrough and a slit extending from said hole to the outside of the cylinder enabling the cylinder to be opened at the slit to place the cylinder on said bow string, a flange at each end of said cylinder forming a groove around said cylinder between said flanges, and a clamp ring in said groove, said ring being squeezed closed on said [elastomeric] *compressible* cylinder releasably securing the cylinder on said bow string and capable of being opened to adjust the cylinder on said string or to remove the cylinder.

8. In the archery bow defined in claim 7, a third cushioned nock mounted on said string far enough below said second cushioned nock to permit mounting on said string a release device between said second and said third cushioned nocks.

9. In an archery bow including a bow string, a clamp-on string nock fixed on said string to locate an arrow at a nocking point below said string nock, and a first cushioned nock mounted on said string below said nocking point far enough to receive the end of an arrow between said clamp-on nock and said cushioned nock, and said cushioned nock comprising:

a[n elastomeric] *cylinder* cushioned *with a compressible material, said compressible material of the type adapted for absorbing a compressible force and returning to an initial state, said* cylinder having an axial hole therethrough and a slit extending from said hole to the outside of the cylinder enabling the cylinder to be opened at the slit to place the cylinder on said bow string, a flange at each end of said cylinder forming a groove around said cylinder between said flanges, and a clamp ring in said groove, said ring being squeezed closed on said [elastomeric] *compressible* cylinder releasably securing the cylinder on said bow string and capable of being opened to adjust the cylinder on said string or to remove the cylinder.

10. In the archery bow defined in claim 9, a second cushioned nock mounted on said string far enough below said cushioned nock to permit mounting on said string a release device between the cushioned nocks.

11. A cushioned nock for a bow string comprising a[n elastomeric] *cylinder* cushioned *with a compressible material of the type adapted for absorbing a compressive force and returning to an initial state, said* cylinder having an axial hole therethrough and fabricated of mating halves having interengaging hubs, the hub of one half being receiving the hub of the other and said halves having interengaging shoulder and groove portions, each half being split radially from said hole to enable each half to be slipped over a bow string prior to axially engaging the two mating hubs, a flange at each end of said cylinder forming a groove around said cylinder between said flanges, and a generally C-shaped metallic retainer mounted in said groove with the ends of said retainer initially spaced far enough for a bow string to pass therebetween, said retainer being squeezed closed on said [elastomeric] *compressible* cylinder releasably securing the cylinder on the bow string.

12. A cushioned nock according to claim 11 in which the ends of said retainer are provided with mating tongue and groove portions aligning said ends when the retainer is squeezed closed.

* * * * *